Patented Aug. 12, 1941

2,251,996

UNITED STATES PATENT OFFICE 2,251,996

PROCESS FOR MAKING ANESTHETIC BASES AND INTERMEDIATES

Samuel D. Goldberg, Forest Hills, N. Y., assignor to Novocol Chemical Mfg. Co. Inc., Brooklyn, N. Y., a corporation of New York No Drawing. Application June 15, 1938, Serial No. 213,931

5 Claims. (Cl. 260—472)

This invention relates to processes for manufacturing local anesthetic bases and solutions and intermediates therefor. This application is a continuation in part of my copending application Ser. No. 43,713, filed October 5, 1935, now Patent No. 2,139,818.

The principal object of the present invention is to provide a simple and efficient process for the production of anesthetic bases and solutions; and to provide a method for producing intermediates for the manufacture of such bases.

In my said copending application there are described a series of local anesthetic bases and solutions having relatively low toxicity compared with their potency, which may employ a smaller quantity of anesthetic and vaso-constrictor to produce equal or greater anesthetic effects; as well as a series of local anesthetic bases in solutions which may be used as surface anesthetic requiring less than the quantity of procaine for this purpose and having other advantages; and methods for producing these materials.

According to the present invention, I have found a process for producing an anesthetic base comprising combining a nitro benzoyl compound with a compound comprising a substituted secondary amino ethanol to form a mono alkyl amino ethyl nitro benzoate, and reducing the resulting compound to form a mono alkyl amino ethyl amino benzoate. In accordance with my invention, I have also found a process for producing said ethanols.

An example of the process embodying my invention will now be described as follows:

Example 1

A mono alkyl amino ethanol prepared as described below is reacted with a nitro benzoyl halide to produce the corresponding mono alkyl amino ethyl nitro benzoate which is then reduced to form a mono alkyl amino ethyl amino benzoate as described in my said copending application Serial No. 43,713, now Patent No. 2,139,818. A method which I have successfully employed for the production of the ethanol is as follows:

Into a pressure flask is placed 149 grams of normal mono butyl aniline to which is added directly 40 grams (or .95 mol) of ethylene oxide. The flask was immediately stoppered and well shaken. It was then allowed to stand at room temperature for about three weeks. At the end of this time the contents of the flask were transferred to a distilling flask and distilled. The yield of butyl hydroxy ethyl aniline was quantitative. There was no low boiling fraction. The yield was 155 grams or 96% of theory. Boiling point 300° at 760 millimeters. To 50 grams (1 mol) of butyl hydroxy ethyl aniline thus prepared was added 19 grams of hydrochloric acid (2 mols) and the mixture cooled to 5° C. While agitated 1 mol of sodium nitrite was added slowly until the test with starch iodide paper indicated a slight excess of nitrous oxide. The nitrosated material was then dropped slowly on a boiling solution of 50% sodium hydroxide and steam-distilled. The steam distillation was continued until the distillate was no longer cloudy. The distillate was then extracted with ether, the ether dried and distilled. The yield was 10 grams of the normal mono butyl amino ethanol boiling at 198° to 200° or 33⅓% theory.

This method may be employed for preparing the other mono alkyl secondary alcohols, namely the mono-isobutyl-, the mono-normal-amyl-, and mono-isoamyl-, mono-normal-propyl-, the mono-isopropyl-, and the mono-ethyl-amino ethanol.

The normal butyl ethanol and the other ethanols just recited are reacted with a nitro benzoyl halide, for instance, with para nitro benzoyl chloride to form the corresponding normal alkyl amino ethyl nitro benzoates, which are then reduced to form the corresponding mono alkyl amino ethyl amino benzoates. As pointed out above, the formation of the nitro benzoates and their reduction, including the precautions to be observed, are more fully set forth in my said Patent No. 2,139,818.

Another reaction which may be employed is that between para nitro benzoyl chloride and ethylene chlorhydrin to produce chlor ethyl para nitro benzoate which may be reduced to produce chlor ethyl para amino benzoate. This may then be reacted with an alkyl primary amine to form the mono alkyl amino ethyl para amino benzoate. The reaction is as follows:

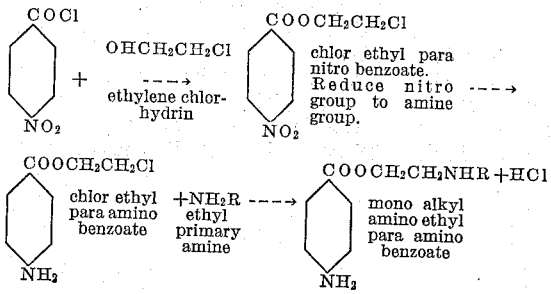

Example 2

Specifically the process may be carried out as follows: 25 grams of para nitro benzoyl chloride and 10 grams of anhydrous ethylene chlorhydrin in 25 cc. of benzene were refluxed until hydrochloric acid gas was no longer evolved. The benzene solvent was then removed by filtration and the residue washed with a 10% solution of sodium hydroxide which removed the unreacted para nitro benzoyl chloride and some para nitro benzoic acid which had been formed, and then washed with water until free from alkali and air dried. It was recrystallized from alcohol and obtained in the form of long yellow needles with a melting point of 56° C. The yield was practically theoretical.

The chlorethyl para nitro benzoate was reduced with the aid of tin and hydrochloric acid in an alcoholic solution as follows: 50 grams of chlorethyl para nitro benzoate, 60 grams of tin, 200 cc. of concentrated hydrochloric acid in 200 cc. of ethyl alcohol were allowed to react in the usual manner. When the reaction was completed, the solution was cooled until the entire mass became solid, and then transferred to a suction funnel and washed sparingly with ethyl alcohol. It was then transferred to a beaker, where the solid compound was treated with a 20% sodium hydroxide solution. The tin dissolves, and the granules which were formed on standing, were then filtered off, washed with water until free from alkali and dried. In order to free these granules from the tin which they enclosed, the solid material was extracted with acetone and filtered with the aid of filter cell. The acetone solution was then distilled off and a 50% solution of alcohol and water added to the residue to recrystallize the chlorethyl para amino benzoate. The crystals formed were long pale yellow needles, melting at 84.5° C. and the yield was 35 grams or 80% of theory.

10 grams of chlorethyl para amino benzoate, and 4 grams of isobutyl amine in 40 grams of amyl alcohol were allowed to reflux for twenty-four hours, the alcohol was then distilled and the residue extracted with a dilute solution of hydrochloric acid. It was then filtered from any insoluble materials and the clear solution reprecipitated with ammonia. The oil that was formed was extracted with ether and dried. The oil is mono isobutyl amino ethyl para amino benzoate. The hydro chloride of this compound is prepared therefrom by adding the necessary quantity of hydrochloric acid. It is then recrystallized from a suitable solvent from which it is crystallized.

Example 3

Instead of conducting the reaction of nitro benzoyl chloride with anhydrous ethylene chlorhydrin in benzene, it may be conducted in alkaline solution for example in sodium hydroxide solution, and the chlor ethyl para nitro benzoate thereafter transformed into the anesthetic. Specifically this is done as follows:

10 grams of anhydrous chlorohydrin are added to 100 cc. of water in which is placed 3 grams of solid sodium hydroxide. The reaction mixture is stirred with cooling until the sodium hydroxide goes into solution. The temperature is then raised by external heat to between 30 and 40° C. Then 25 grams of powdered para nitro benzoyl chloride is added, the reaction mixture stirred when a rise in temperature will be obtained and an oil is first formed. On further agitation and cooling chlor ethyl para nitro benzoate which is formed becomes a solid. The chlor ethyl para nitro benzoate is reduced as indicated in Example 1 and reacted with the primary amine to form the mono alkyl ethyl para amino benzoate.

The methods may be employed for preparing other mono alkyl anesthetics, for example the mono-normal butyl-, mono-normal-amyl- and mono-isoamyl-, mono-normal-propyl-, and mono-isopropyl-, and mono-ethyl-amino ethyl amino benzoates.

The expression "mono butyl amino" as employed in the claims is intended to cover both mono normal butyl amino compounds as well as compounds containing the isomers of the mono butyl group. Similarly the expressins "mono amyl amino" and "mono propyl amino" are intended to cover both the normal compounds and the isomers thereof.

While I have described my improvements in great detail and with respect to preferred forms thereof, I do not desire to be limited to such details and forms since many changes and modifications may be made and the invention embodied in widely different forms without departing from the spirit and scope thereof in its broader aspects. Hence I desire to cover all modifications, forms and embodiments coming within the language or scope of any one or more of the appended claims.

What I claim as new and desire to secure by Letters Patent is:

1. A process for the preparation of an ethanol which comprises reacting a mono alkyl aniline with ethylene oxide to obtain the corresponding alkyl hydroxy ethyl aniline, nitrosating the alkyl hydroxy ethyl aniline, and treating the nitrosated material with caustic alkali to form mono alkyl amino ethanol.

2. A process for producing an anesthetic base which comprises reacting a mono alkyl aniline with ethylene oxide to obtain the corresponding alkyl hydroxy ethyl aniline, nitrosating the alkyl hydroxy ethyl aniline, treating the nitrosated material with caustic to form mono alkyl amino ethanol, combining a nitro benzoyl halide compound with said ethanol to form a mono alkyl amino ethyl nitro benzoate, and reducing the resulting compound to form a mono alkyl amino ethyl amino benzoate.

3. A process according to claim 2 in which the mono alkyl aniline is mono butyl aniline and the benzoate obtained is mono butyl amino ethyl amino benzoate.

4. A process according to claim 2 in which the mono alkyl aniline is mono propyl aniline and the benzoate obtained is mono propyl amino ethyl amino benzoate.

5. A process according to claim 2 in which the mono alkyl aniline is mono amyl aniline and the benzoate obtained is mono amyl amino ethyl amino benzoate.

SAMUEL D. GOLDBERG.

CERTIFICATE OF CORRECTION.

Patent No. 2,251,996.                           August 12, 1941.

SAMUEL D. GOLDBERG.

It is hereby certified that error appears in the printed specification of the above numbered patent requiring correction as follows: Page 1, first column, line 19, for "anesthetic" read --anesthetics--; same page, second column, line 5, for "prapared" read --prepared--; line 18, before "theory" insert --of--; lines 51-54, in the reaction, for "ethyl primary amine" read --alkyl primary amine--; page 2, first column, lines 55 and 56, strike out the words "from which it is crystallized"; same page second column, line 22, for "expressins" read --expressions--; and that the said Letters Patent should be read with this correction therein that the same may conform to the record of the case in the Patent Office.

Signed and sealed this 14th day of October, A. D. 1941.

(Seal)                                                                 Henry Van Arsdale,
Acting Commissioner of Patents.